United States Patent [19]
Wright et al.

[11] Patent Number: 5,365,991
[45] Date of Patent: Nov. 22, 1994

[54] CURTAIN SUPPORT

[75] Inventors: Robert M. Wright; Jerry D. Wisbey; William T. Slaughter, all of Cincinnati, Ohio

[73] Assignee: Cincinnati Milacron Inc., Cincinnati, Ohio

[21] Appl. No.: 81,871

[22] Filed: Jun. 25, 1993

[51] Int. Cl.$^5$ .............................................. E06B 9/06
[52] U.S. Cl. .................. 160/84.1 C; 160/117; 411/8; 29/DIG. 56; 409/134
[58] Field of Search .............. 160/84.1 R, 84.1 E, 160/84.1 A, 85, 86, 201, 117; 248/548, 900; 409/134; 408/241 G; 29/DIG. 50, DIG. 56, DIG. 59; 411/8

[56] References Cited

U.S. PATENT DOCUMENTS

| | | | |
|---|---|---|---|
| 1,229,523 | 6/1917 | Roehrich | 160/84.1 E |
| 2,417,671 | 3/1947 | Armitage | 160/85 X |
| 4,091,857 | 5/1978 | Jacobs | 160/330 |
| 4,278,352 | 7/1981 | Keller | 356/358 |
| 4,500,065 | 2/1985 | Hennekes et al. | 248/542 |
| 4,667,353 | 5/1987 | Zeigler et al. | 4/607 |
| 5,178,499 | 1/1993 | Umeda et al. | 29/DIG. 56 |
| 5,181,898 | 1/1993 | Piotrowski | 483/3 |

OTHER PUBLICATIONS

"Gortite" 16 page brochure of A and A Manufacturing Co., Inc. 2300 S. Calhoun Rd., New Berlin, Wisc. 53151-Bulletin No. PR 100-J Copyright 1985 (Rev. Oct. 1991).

"Rail-Type 3 and 5-Axis Gantry CNC Vertical Profiling Machines", Publn. No. SP-161, of Cincinnati Milacron Marketing Company, published Aug. 8, 1989.

Primary Examiner—Blair M. Johnson
Attorney, Agent, or Firm—Thomas M. Farrell

[57] ABSTRACT

A moving slide has a pair of flexible curtains mounted to its front and rear surfaces, the curtains being attached at opposite ends to front and rear support posts mounted to a base. The support posts have upper and lower pulleys. A cable is connected to the front of the slide and runs in this fashion: first horizontally across the top pulley, thence to the lower pulley, thence to the other support post, thence upwardly and finally around to the horizontal portion which connects to the rear of the slide. The cable is tensioned to a predetermined load which remains constant throughout the slide travel as the front and rear horizontal portions of the cable move. The flexible curtains are suspended from, but are not rigidly attached to, the cable. Thus, as the curtains expand and contract, the moving horizontal portions of the tensioned cable ride smoothly through the curtains, maintaining curtain support.

15 Claims, 7 Drawing Sheets

CURTAIN SUPPORT

FIELD OF THE INVENTION

In general, the invention relates to compact supports for extensible curtains. In particular, the invention relates to a method and apparatus for providing support for extremely long curtain-like guards for machine tools.

BACKGROUND OF THE INVENTION

In metalcutting machine tools, it is frequently necessary and desirable to provide a device for containing the metal chips within an enclosed environment in order to prevent chip contamination of precision machine ways, keep operator walkways clean, render chip cleanup in an easier fashion, etc.

In relatively small machine tools, for example, that depicted in U.S. Pat. No. 5,181,898, of T. W. Piotrowski, Jan. 26, 1993, entitled Cover Assembly for Multi-Configurable Machine Tool, a totally enclosed rigid guarding system is provided for the machine. On still older types of machine tools, for example, manually controlled knee mills, it has been known to use an operator shield or sheet metal panel which may be stood up at the edge of a machine table to deflect errant metal chips back onto the table.

In very large machine tools, for example, stack routers and profilers used in the aircraft industry, the problem of chip containment becomes more acute. The reasons for this include the fact that the workholding base of the machine is extremely long, a typical bed length being in the magnitude of forty to fifty feet, and the motorized spindle head, which drives multiple spindles and cutting tools, traverses the full length of the bed. Further, the workpieces are often aluminum, and the free cutting, lightweight chips are projected far from the workpiece.

Because of the length of travel involved, consideration of machine guarding to assist in chip containment within the machine confines naturally directs a designer to consider an extensible guard which can expand and collapse according to the direction of cutter travel. Consideration of extensible guarding leads one to consider curtains which may be folded and extended much like a shower curtain, and bellows-type guarding wherein sewn or molded discrete bellows sections are joined serially to create a long accordion-like extensible guard.

In a machine tool such as a multi-axis profiler, the work surface and slide movement is generally in a horizontal direction, thus necessitating a relatively thin vertical curtain which tends to be very flimsy and must be adequately supported to keep from falling over.

It has been well-known in the bellows art to provide clinched grommets spaced along the bellows length, where the grommets are fitted over a stationary rod so the bellows may hang and ride in a straight line as it is horizontally expanded or contracted. The rod solution does not lend itself to extremely long extensible guards because of the sag involved and the difficulty in placing any rod support intermediate of the rod ends.

U.S. Pat. No. 4,278,352, of B. E. Keller, Jul. 14, 1981, entitled Support System for Extensible Bellows, teaches an apparatus for supporting a horizontally extended bellows which encloses a light beam in an optical interferometer, wherein one end of the bellows is attached to a relatively stationary support while the other end of the bellows is relatively movable and is attached to a movable slide. The bellows is fitted with a plurality of spaced grommets along each side, and a pair of side cables are threaded through the grommets in a generally horizontal fashion. One end of a cable is attached to the slide while the other end of the cable is tensioned by the following means:

(a) in one embodiment, the cable extends over a pulley to a vertical attitude, and a weight is hung on the end of the cable to keep tension and thereby horizontally support the bellows; and (b) an alternative embodiment discloses that the tension producing end of the cable be attached to a spring-loaded take-up spool which will tend to wind the cable as the slide moves toward the take-up spool. As the slide moves away from the take-up spool, the cable always remains taut.

Several difficulties inherent in the '352 patent device prevent its use in a machine tool which has extremely long horizontal travel. In the first embodiment, the gravity device provides no adjustment for the tension force. The vertical travel of the tensioning weight is the same as the horizontal movement, and machine tools of the type described are not configured to have a slide elevation which permits this vertical travel. In the second embodiment, the spring-wound spool is not capable of maintaining a substantially constant tension force in the cable as the slide is moved over an extremely long travel, since, although the spring mechanism is not detailed in the '352 patent, most springs have a linear relationship in their load-to-travel ratio; this also applies to torsion springs. The '352 patent device imparts an unbalanced load to the slide, and a widely fluctuating unbalanced load may seriously affect slide position.

The present invention obviates the foregoing difficulties of the '352 patent in a novel manner.

SUMMARY OF THE INVENTION

It is an object of the present invention to provide an extensible curtain for a generally horizontally moving machine tool wherein the curtain is suspended from a relatively compact support member.

Another object of the present invention is to provide an overall compact moving curtain assembly for use in a machine tool and the like.

Still another object of the present invention is to provide an extensible curtain support system, wherein the curtain is suspended from a flexible cable and the cable is maintained under relatively constant tension force throughout the travel of the curtain.

With the foregoing objects in mind, the invention is shown embodied in a curtain support for use in a device having a relatively stationary member, for example, a machine tool base, a relatively movable member, for example, a machine tool slide, and an extensible curtain attached at its respective opposite ends to the stationary and movable members so as to collapse and expand the curtain length along a generally linear path in accordance with relative movement between the members. The curtain support comprises:

first and second pulley support means for supporting a flexible cable, the first and second pulley support means being spaced along the curtain path and affixed to the stationary member, wherein the first and second pulley support means include respective first and second pulleys;

a flexible cable trained over the first and second pulleys and running along the curtain path;

means for suspending the extensible curtain from the cable; and means for attaching the flexible cable to the movable member so as to vary the length of cable running along the curtain path as the extensible curtain collapses and expands.

In an alternate embodiment of the invention, attaching means for the cable includes release means for relieving tension from the flexible cable in the event of cable tension exceeding a predetermined maximum amount.

DESCRIPTION OF THE PREFERRED EMBODIMENT

Figure 1:
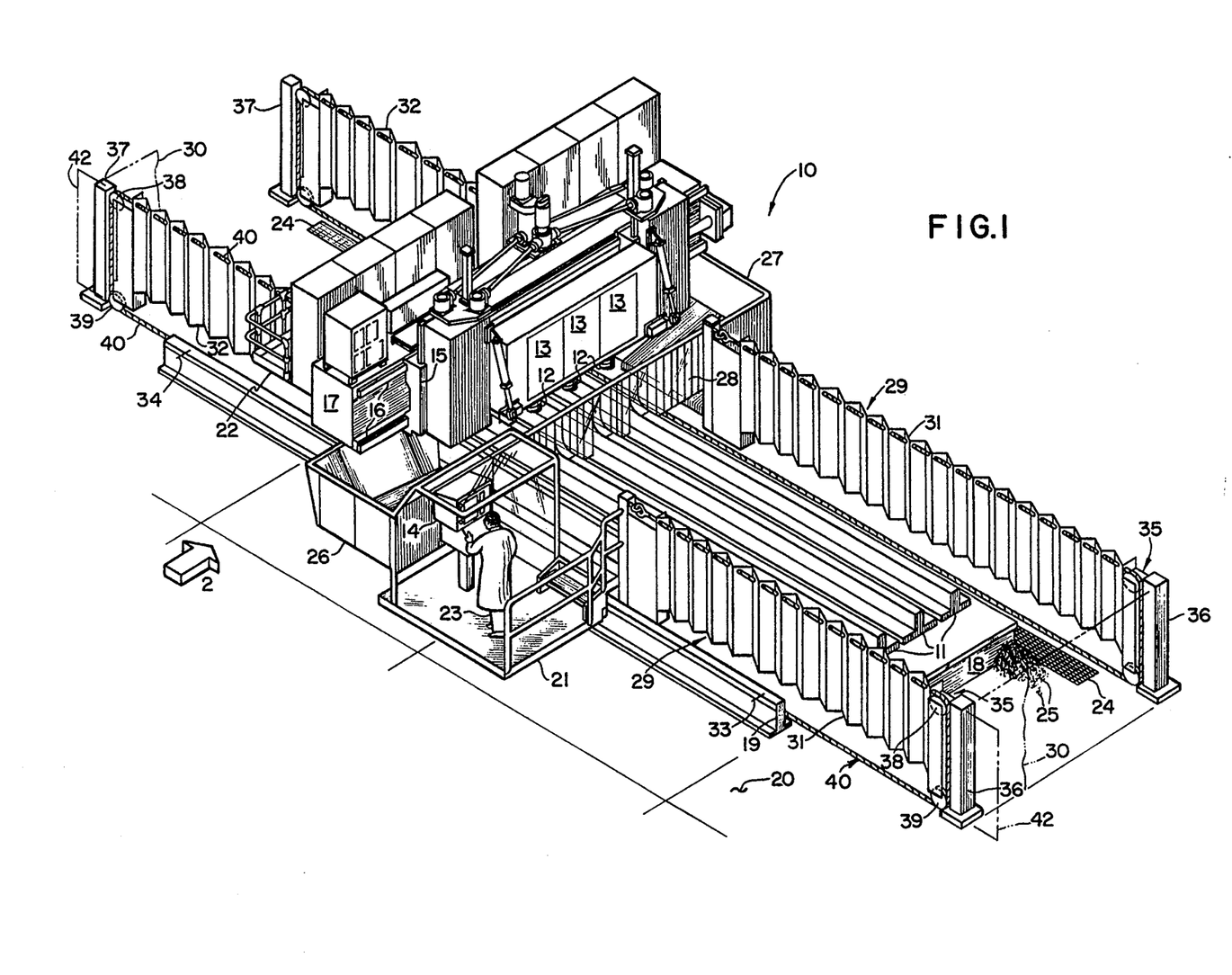
FIG. 1 is a perspective view of a machine tool having an extremely long bed and a movable gantry, movable along the bed length, and having extensible side curtains affixed to both front and rear surfaces of the moving gantry.

Referring to FIG. 1 of the drawings, there is shown a very large machine 10 typically used in the aircraft industry. This machine 10 is known as a rail-type five-axis gantry CNC vertical profiling machine, commercially manufactured by Cincinnati Milacron Inc., assignee of this invention. In this machine 10, very long workpieces 11 are sculpted by cutters 12 held in three spindle carriers 13 moving under command of a computer control 14. The spindle carriers 13 are supported for vertical movement on a slide 15 which, in turn, moves transversely of the bed on the ways 16 of a movable bridge or gantry slide 17. The gantry slide 17 moves horizontally along the length of the bed 18 on parallel rails 19 mounted to the floor 20. The gantry slide 17 on this particular type of machine 10 is quite large and includes platforms 21,22 at the front and rear ends for supporting an operator 23 and other service personnel (not shown). For all practical purposes, the machine bed 18, rails 19, and floor 20 may be considered as a common base, since they are relatively stationary with respect to one another. The floor 20 is provided with a grating 24 within which a conveyor (not shown) may convey chips 25 to a common location in a shop, in a well-known manner, and so it is necessary that the chips 25 created while machining be maintained generally on the machine bed 18, or at least within its close proximity on the floor 20, so that easy clean-up is facilitated by a maintenance worker having a push broom. To assist in maintaining the chips 25 within the machine confines, the gantry slide 17 is provided with sheet metal bins 26,27 at the sides of the machine 10, which are sloped to guide chips 25 towards the floor grating 24. A flexible curtain 28 of clear plastic flaps is optionally strung across the bed 18 on the moving gantry slide 17, and a flexible curtain system 29 is provided at each side of the machine 10, between the machine bed 18 and rail 19. The flexible curtain system 29 is essentially the same for each side of the machine 10, with the exception that the connection points vary slightly due to the platform configuration. End panels 30 may be erected between the flexible curtain systems 29 to fully define an enclosed area.

In the preferred embodiment, the flexible curtain system 29 comprises a pair of extensible curtains 31,32, one curtain 31 at the front of the machine 10 and one curtain 32 at the rear of the machine 10. The gantry slide 17 moves between front and rear end-of-travel positions 33,34 defined on the machine rails 19, and the flexible curtain system 29 is supported on a curtain support system 35 which comprises spaced-apart front and rear anchor posts 36,37 which are stationarily mounted to the floor 20. The front anchor post 36 would therefore be proximal the front end-of-travel position 33, while the rear anchor post 37 would be proximal the rear end-of-travel position 34. The anchor posts 36,37 have upper and lower rotatable pulleys 38,39 around which is trained a flexible cable 40, for example, a wire rope, and the cable ends are attached to the gantry slide 17 in such manner that the cable 40 remains under substantially constant tension as the gantry slide 17 moves back and forth and the cable 40 moves across the support pulleys 38,39. The front and rear curtains 31,32 are suspended from the cable 40, but not rigidly attached thereto, so the cable 40 may move unimpeded through grommets 41 (see FIG. 3) provided in the curtains 31,32 as the curtains 31,32 alternately collapse and expand. The curtain width is relatively thin in comparison to the overall length and height; to achieve a very compact assembly, the cable 40 lies in a vertical cable plane 42.

Figure 2:
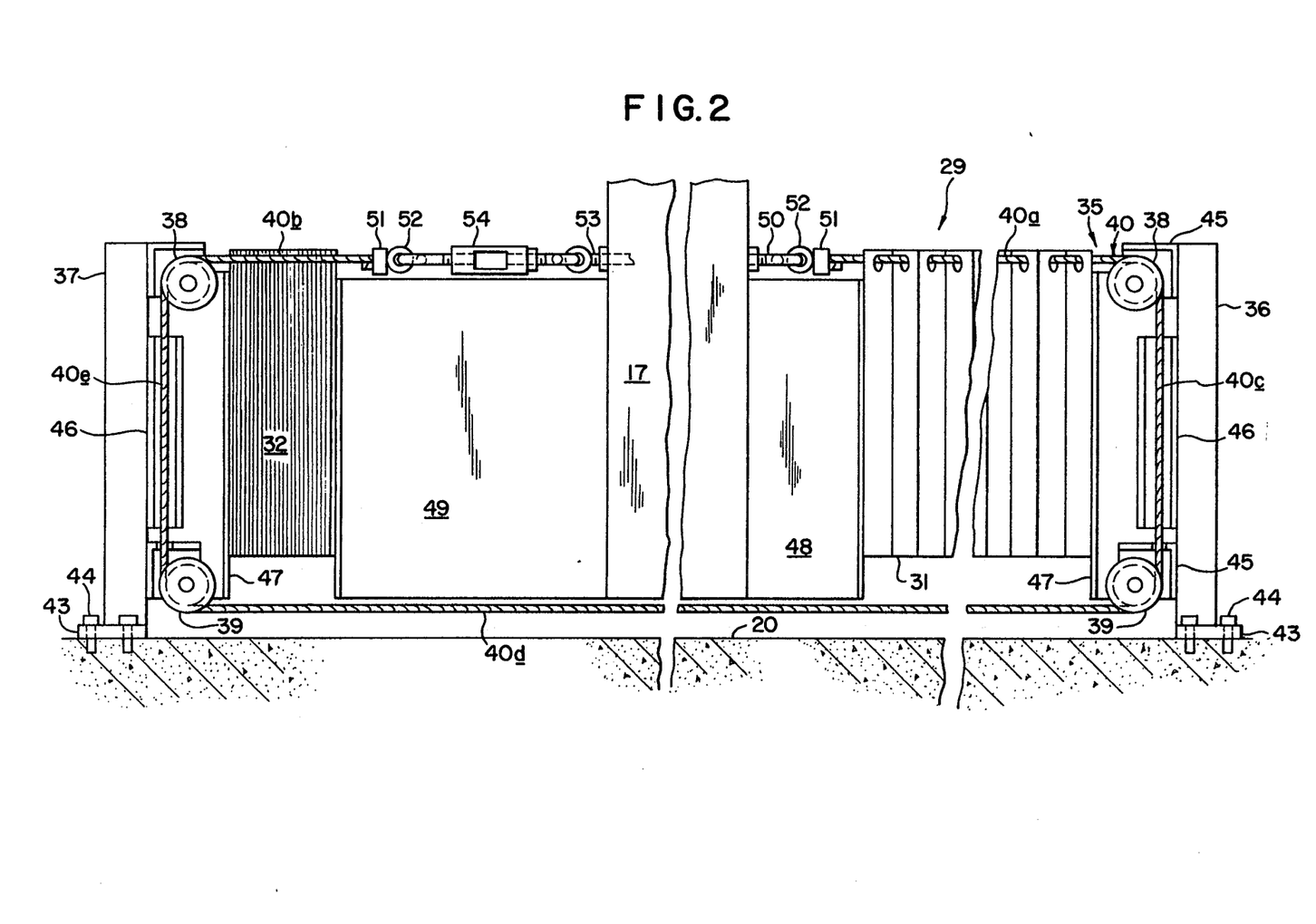
FIG. 2 is a side elevational view of the curtain support system, taken in the direction of arrow 2 of FIG. 1.

Referring to FIG. 2, the simplified figure shows the spaced-apart front and rear anchor posts 36,37 as being columns attached to the floor 20 by means of integral flanges 43 and screws 44. The gantry slide 17 is shown at its rear end-of-travel position 34, that is, to the left of the drawing figure, and the rails 19 have been omitted for purposes of clarity. The front and rear anchor posts 36,37 are essentially of the same construction, having a top pulley 38 rotatably supported in a bracket 45 affixed to the anchor post 36,37, and a bottom pulley 39 rotatably supported in a like manner. A tube 46 is welded to the side of the anchor post 36,37 to provide an enclosed vertical conduit for the cable 40. The anchor post 36,37 also carries a sheet metal curtain end retainer 47, which forms a vertical flat surface to which the end of the curtain 31,32 may be bolted in a conventional manner. The gantry slide 17 is provided with a front curtain end retainer 48 and a longer rear curtain end retainer 49 to which the front and rear curtains 31,32 are respectively fixed. The front end of the gantry slide 17 is provided with a horizontally mounted eyebolt 50, which is connected in line with the top pulley 38 so that the front top portion 40a of the cable 40 will ride between the pulley 38 and the eyebolt 50 in a substantially horizontal manner. The cable 40 is connected to the front eyebolt 50 by suitable fittings which may include a clamp 51 and an eyelet member 52. The rear end of the gantry slide 17 is also provided with an eyebolt 53, in line with the top pulley 38, so that the rear top portion 40b of the cable 40 will be held in a substantially horizontal attitude. The rear cable end is also provided with suitable cable fittings which may include a clamp 51 and an eyelet member 52, and a turnbuckle 54 is introduced between the cable 40 and the gantry slide eyebolt 53 so that the cable 40 may be tightened to a predetermined tension load. As can be seen from the drawings, running from the gantry slide 17 to the right, the cable 40 extends horizontally to the top pulley 38, then changes direction in a first turnaround portion 40c and moves downwardly to the lower pulley 39, close to the floor 20; the cable 40 next runs in an anchor post connector portion 40d, to the rear lower pulley 39, where it again changes direction in a second turnaround portion 40e, and moves up vertically to the rear top pulley 38; the cable 40 then runs horizontally and connects to the rear end of the gantry slide 17. The front curtain 31 is shown fully expanded, or unfolded, and connected to the curtain end retainers 47,48. The cable 40 passes through grommets 41 in the curtain 31, but is not attached to the curtain 31, so that the cable 40 may move freely through the curtain 31 as the curtain 31 expands and collapses. The rear curtain 32 is supported in a like manner, and is shown fully collapsed, or folded. Here it will be noted that, while it is intended that the top portions 40a,b of the cable 40 passing through the curtains 31,32 are to be maintained in a substantially horizontal attitude, it is not essential that portions 40c,d of the cable 40 spanning the upper and lower pulleys 38,39 be vertical or that the bottommost portion 40d of the cable 40 be horizontal. It will be appreciated that other pulleys could be introduced in the various spans of the cable 40 should it become necessary to route the cable 40 around machine elements.

Figure 3:
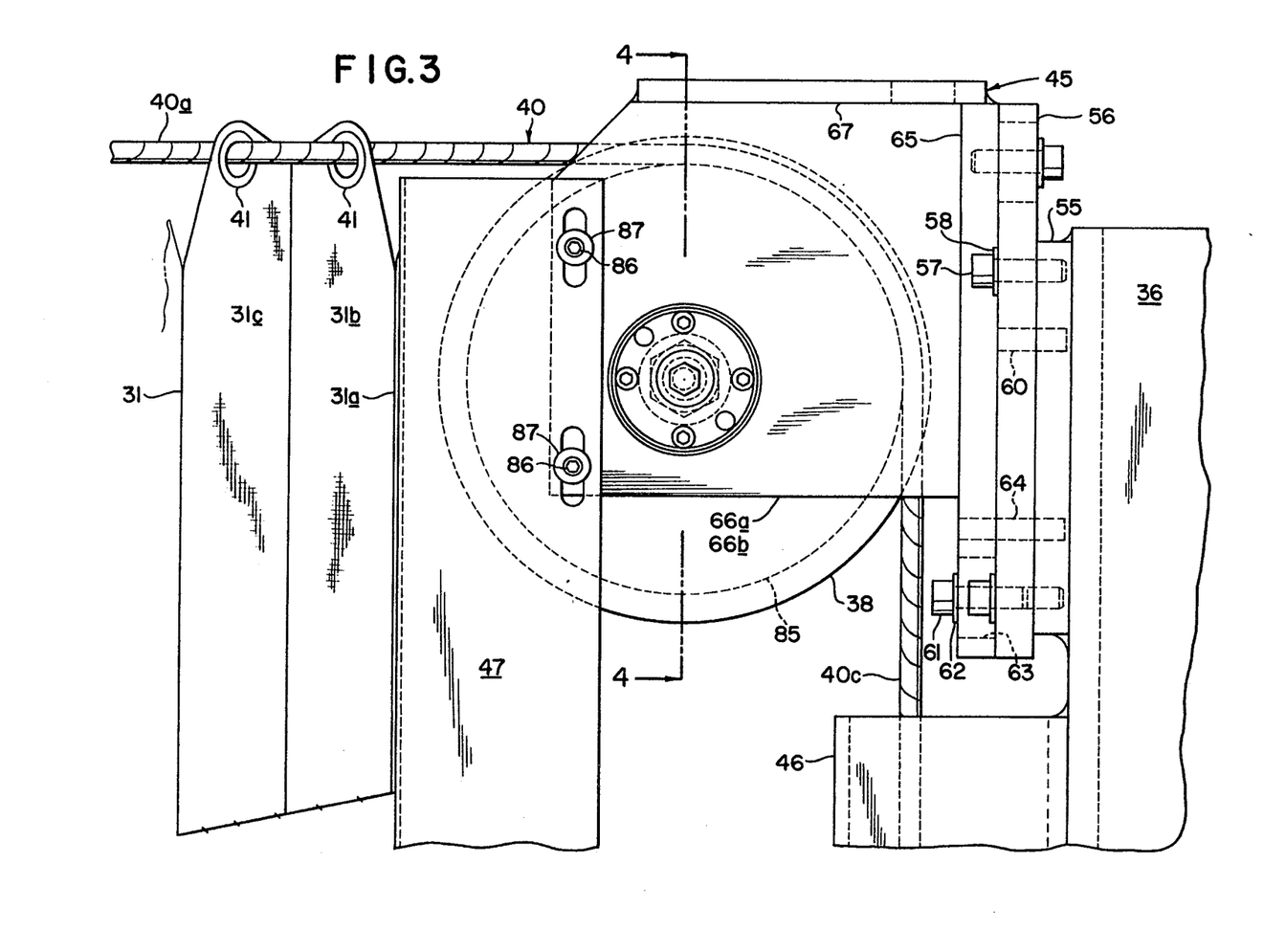
FIG. 3 is an enlarged view of the upper right corner of the curtain support system of FIG. 2, illustrating the typical pulley support details.
Figure 4:
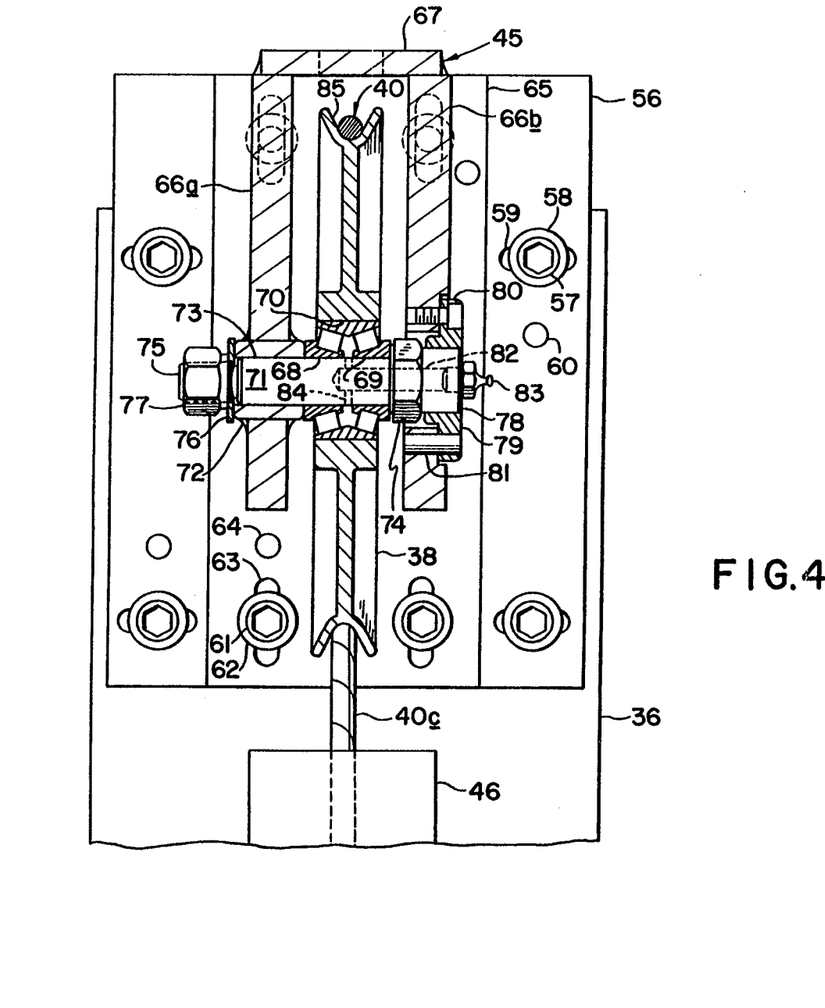
FIG. 4 is an elevational section through the pulley support, taken along the line 4—4 of FIG. 3.

Referring to FIGS. 3 and 4 together to view typical pulley support details, the front anchor post 36 is shown as having a pad 55 welded to its side, above the welded tubing 46. The pad 55 supports a horizontal adjustment plate 56 which is secured by screws 57 passing through washers 58 and through horizontal slots 59. The adjusted position is maintained by pins 60. The adjustment plate 56 carries a pulley bracket 45 which is mounted by screws 61 passing through washers 62 and vertical slots 63, to provide adjustment, and the bracket 45 is finally located by pins 64. The bracket 45 has a base plate 65, parallel side plates 66a,b, and a top plate 67, welded in unitary assembly. The side plates 66a,b form a straddle mount for the pulley 38. Looking at FIG. 4, the pulley 38 is carried on a pair of roller bearings 68,69, mounted to a bore 70 in the pulley 38 and carried on a shaft 71 which passes through a welded hub 72 in one of the bracket side plates 66a. The shaft 71 has a bearing diameter 73, and an enlarged adjacent hexagonal head 74 for pulling the bearings 68,69 into a shake-free assembly. The shaft 71 has a threaded outer end 75 which receives a washer 76 and a locknut 77 to draw the assembly snuggly against the hub 72. The outboard end 78 of the shaft 71 is closely fitted into in a radial support cap 79 which is secured to the other side plate 66b by screws 80 and pins 81. The shaft 71 has a central, axially drilled hole 82 which is provided with a grease fitting 83, and a smaller, radially drilled cross hole 84 for feeding lubrication to the bearings 68,69. The pulley 38 has a circumferential groove 85 which supports and guides the wire rope cable 40 in a well-known manner.

Referring back to FIG. 3, the curtain end retainer 47 is secured to the pulley bracket 45 by a pair of screws 86 and washers 87. The end 31a of the curtain 31 is affixed to the curtain end retainer 47, and vertical sections 31b,c of the curtain 31 are fitted with grommets 41 to smoothly ride on the wire rope cable 40.

Here it will be noted that the curtain may be comprised of a variety of materials; for example, those typically used to produce bellows, which include sewn fabric impregnated with a waterproofing material such as rubber. Many other natural and synthetic fabrics and monolithic materials may be substituted without departing from the invention. These materials may be purchased from suppliers of bellows and other types of folding and accordion guards, one exemplary manufacturer being the A&A Mfg. Co., Inc., New Berlin, Wis. 53151.

Figure 5:
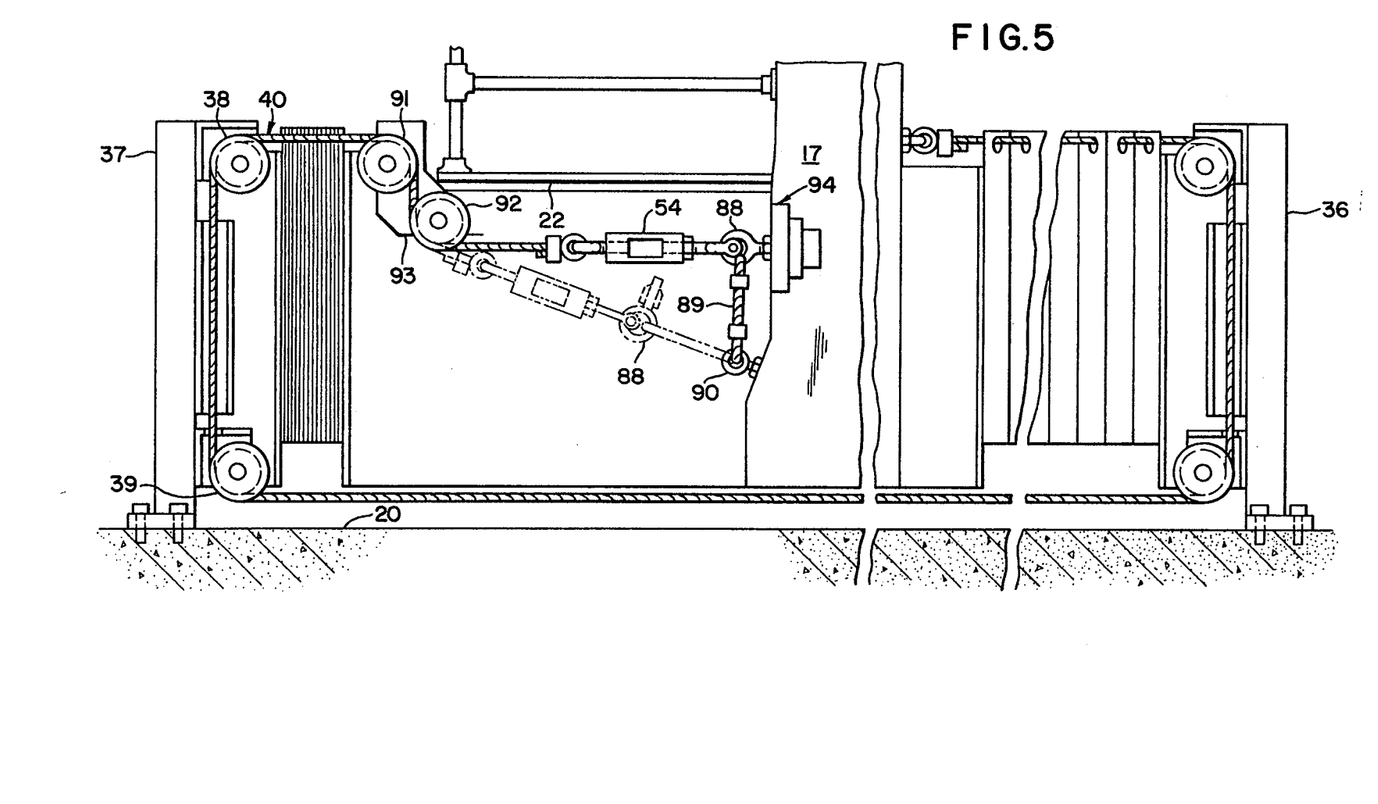
FIG. 5 is a side elevational view of a curtain support system having a cable release overload means.
Figure 6:
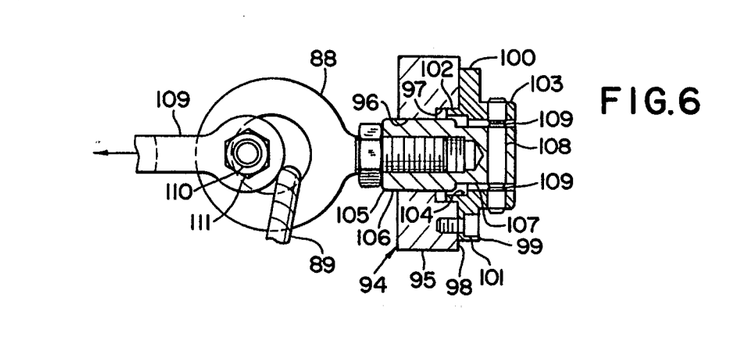
FIG. 6 is an enlarged view of the cable release assembly of FIG. 5.

FIG. 5 shows a construction of the invention which provides protection for an overload which may be imposed on the cable 40. The cable 40 of the preferred embodiment is of predetermined length, $L_1$, and is assembled with a tension load $T_1$ of approximately 2000 pounds (907.2 Kg). It is desired that when a higher predetermined tension load of $T_2$, approximately 6000 pounds (2712.6 Kg), is exceeded for any reason, the attachment eyebolt 88 connecting the cable 40 to the rear of the gantry slide 17 is released. The attachment eyebolt 88 is connected by a tether 89 of wire rope cable, of short length, $L_2$, to a non-releasable lower eyebolt 90 affixed to the gantry slide 17 so that upon release of the attachment eyebolt 88, the usually dormant tether 89 becomes an active part of the cable connection, effectively lengthening the cable length $L_1$, by a known amount, $L_2$, and causing a decrease in tension in the cable to load $T_3$, while maintaining the cable 40 in service as a curtain support. In the assembly of FIG. 5, several additional pulleys 91,92 are introduced into the cable circuit, and are affixed to a bracket 93 which, in turn, is affixed to the rear end of the gantry slide 17, the bracket 93 running beneath the rear platform 22 of the gantry slide 17. Here it should be noted though that these additional pulleys 91,92 do not rotate in normal service; they merely function as guides for routing the cable 40, and grooved guide blocks may easily be substituted. One more thing to note is that the lower eyebolt 90 is preferably positioned directly below the attachment eyebolt 88 to maintain the cable 40 in the cable plane 42, and thereby smoothly translate the lengthened cable out through the additional pulleys 91,92 or other guides, when the attachment eyebolt 88 is released; the additional pulleys 91,92 may rotate at this time to facilitate the translation. The attachment eyebolt 88 is mounted to a breakaway means, release assembly 94, which may be appreciated in detail by referring to FIG. 6 along with FIG. 5. The enlarged view of FIG. 6 shows that the release assembly 94 comprises a rigid retainer plate 95 which is attached firmly to the gantry slide 17, and the plate 95 has a centrally bored hole 96 with a pilot counterbore 97 in its right face 98. The retainer plate 95 supports a cap 99 which has a circular flange 100 attached by screws 101 to the plate 95, and the flange 100 has an adjacent pilot diameter 102 and an oppositely extending hub 103. A stepped clearance hole 104 is provided through the hub 103 and pilot diameter 102. The attachment eyebolt 88 is threadably received into a double-diameter cylindrical shear pin plug 105, which has its outer diameter 106 machined for a sliding fit within the retainer plate 95. The plug 105 has a reduced diameter 107 which extends through the clearance hole 104 of the cap 99. A shear pin 108 extends transversely through the hub 103 and shear pin plug 105, and the pin 108 is provided with a pair of spaced, sharply notched necks 109 to facilitate double shear in the pin 108 as the tension load $T_2$ on the cable 40 is exceeded. When the pin 108 is sheared, the plug 105 will pull out and the tether 89 will come into action. The turnbuckle 54 has been provided with a clevis end 109 which straddles the attachment eyebolt 88, with a clevis bolt 110 and nut 111 to secure the assembly.

It will be appreciated by those skilled in the art that the release assembly 94 and tether 89 of FIG. 5 may be applied to the assembly of FIG. 2, with or without auxiliary cable guides, simply by locating the lower eyebolt 90, or its equivalent, closer to the release assembly 94. In such case, curtain support may be sustained in the event of overload, with the upper cable portions 40a,b remaining in a substantially horizontal attitude.

Figure 7:
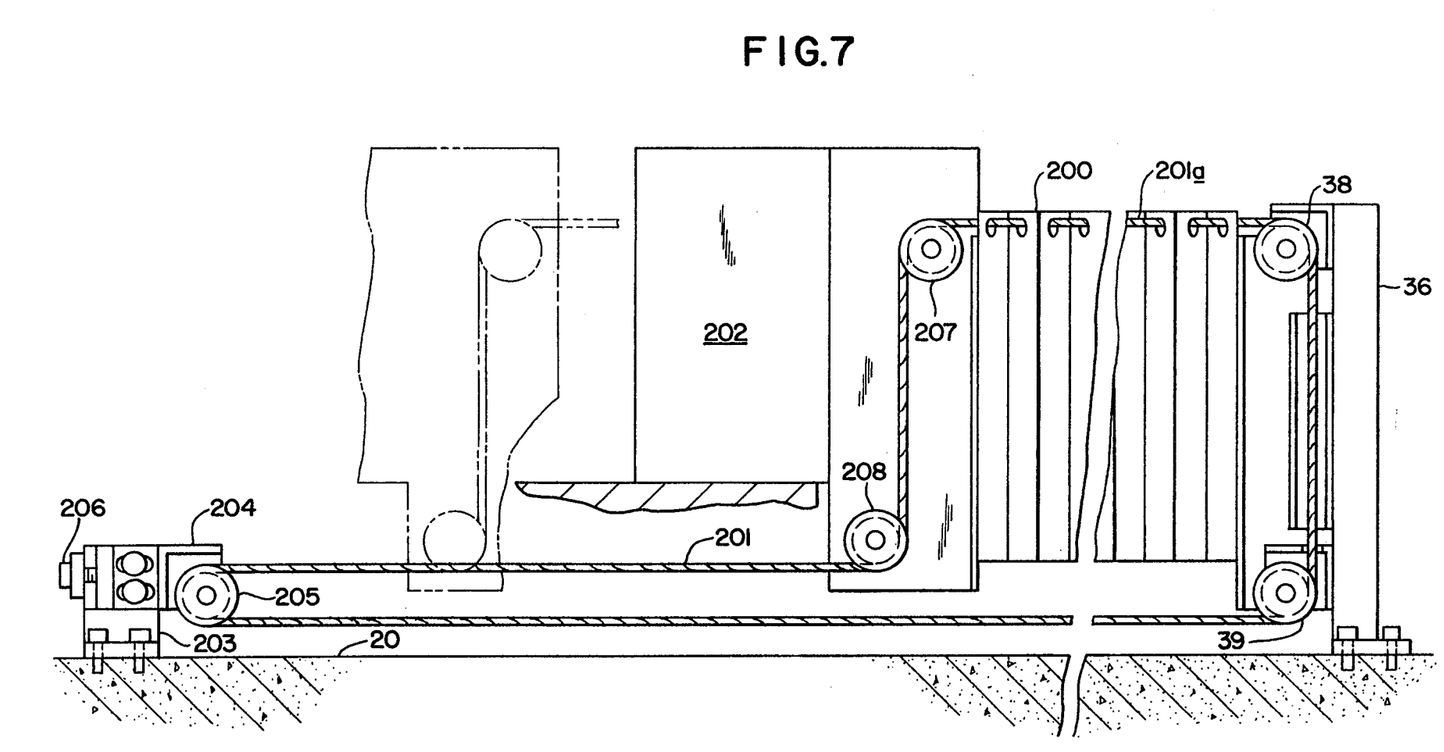
FIG. 7 is a side elevational view of an alternative embodiment curtain support system.

FIG. 7 illustrates an alternate embodiment of the invention, where a single curtain 200 is supported from a cable 201 which has an upper horizontal portion 201a that is extended as the machine slide 202 moves from right to left. The curtain ends are secured as taught in FIG. 2. In this assembly, a right anchor post 36 is used, with upper and lower pulleys 38,38 as in the prior figures, but the left post has been replaced by an anchor block 203, which has a horizontally adjustable pulley bracket 204 and carries a single pulley 205. The single pulley 205 is tensioned by an adjusting screw 206 which exerts an axial screw force equal to twice the tension in the cable 201. The cable 201 extends in this circuit: horizontally from the upper pulley 38 on the anchor post 36 to the upper slide pulley 207; then it wraps, down to the lower slide pulley 208, where it again wraps and extends horizontally to the single pulley 205; next it wraps the single pulley 205, extends back to the anchor post 36 where it wraps the lower pulley 39 and runs upwardly to the upper pulley 38. As the slide 202 and its vertically spaced upper and lower slide pulleys 207,208 move leftward, to the phantom position, the cable 201 will be paid out in the upper horizontal portion 201a, providing support for the expanded curtain 200. As the slide 202 and slide pulleys 207,208 thereafter move rightward to the solid position shown, the upper horizontal portion 201a of the cable 201 is effectively shortened. It will be appreciated that a second, identical assembly may be employed in a reverse oriented direction, to guide an optional second curtain which can be attached to the left face of the slide 202.

Figure 8:
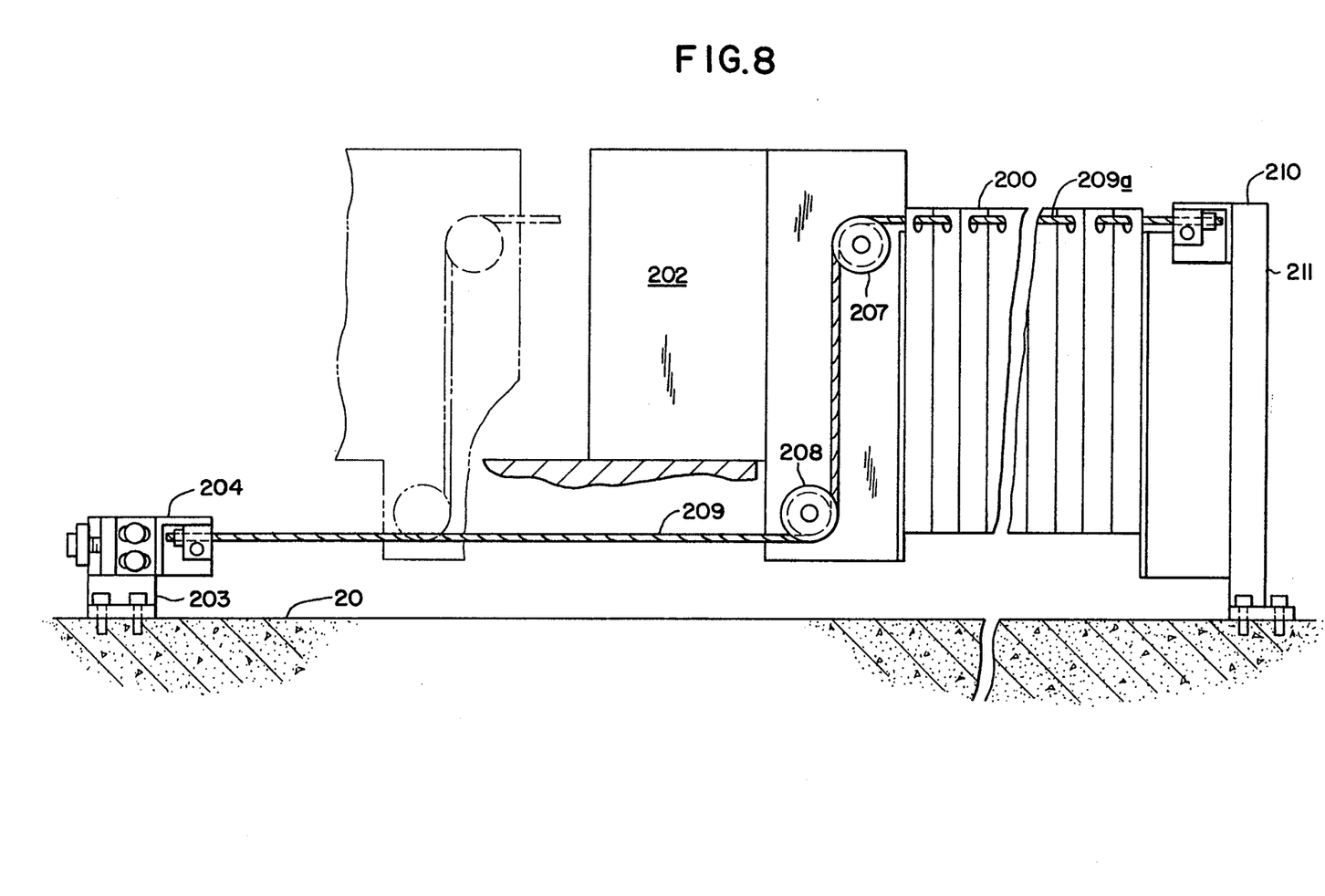
FIG. 8 is a side elevational view of an alternative curtain support system.

FIG. 8 is another alternative embodiment, which is a variation of the assembly of FIG. 7, for supporting a single curtain 200, wherein a cable 209 is simply affixed to the top end 210 of the right anchor post 211. The cable 209 extends leftward through an upper horizontal portion 209a, wrapping around the upper slide pulley 207; the cable 209 then runs down to, and around the lower pulley 208 and then finally extends leftward and is attached to the adjustable bracket 204 of the anchor block 203 mounted to the floor 20. The screw load is equal to the tension force desired in the cable 209, and, once set, the mechanism behaves in the manner of FIG. 7, with the upper horizontal portion 209a of the cable 209 effectively lengthening as the slide 202 travels to the left.

It should be noted that the preference of having a wire rope as the flexible cable 40,201,209 is not intended to exclude other flexible members, for example, chains, belts, bands, flexible cords, and the like which may be utilized in a substitute assembly.

It should also be noted that the tether 89 of FIGS. 5 and 6 may comprise a rigid, swinging link in some applications of the release assembly.

CERTAIN SPECIFICATIONS UTILIZED FOR THE PREFERRED EMBODIMENT (Dimension are approximate)
1. MACHINE
  (a) Bed Width: 120 in. (304.8 cm) work surface; 199 in. (505.5 cm) over ways
  (b) Bed Length: 39 ft. (11.88M) work surface; 49 ft. (14.94M) rails
  (c) Gantry Slide Travel: 39 ft. (11.88M)
  (d) Gantry Weight: 140,000 lbs. (63,504 kg)
2. CURTAIN—4 Required
  (a) Fully-extended Length: 42 ft. (12.80M)
  (b) Fully-retracted Length: 3 ft. (0.91M)
  (c) Height: 5 ft. (1.52M)
  (d) Maximum Width When Fully-retracted: 3 ft. (0.91M)
  (e) Weight: 70 lbs. (31.75 kg)
3. CABLE-GENERAL PURPOSE WIRE ROPE—2 Required
  (a) Diameter: 0.375 in. (9.53 mm)
  (b) Length: 140 ft. (42.67M)
  (c) Breaking Load: 15000 lbs. (6804 kg)
  (d) Operating Load $T_1$: 2000 lbs. (907.2 kg)
  (e) Load to Release Attachment Eyebolt, $T_2$: 6000 lbs. (2712.6 kg)
  (f) Dimension From Floor To Top Cable Centerline: 81 in. (2.06M)

While the invention has been shown in connection with a preferred embodiment and several alternative embodiments thereof, it is not intended to limit the invention to such embodiments. Rather, the invention extends to all such designs and modifications as come within the scope of the appended claims.

What is claimed is:

1. A curtain support for use in a device having a relatively stationary member, a relatively movable member and an extensible curtain attached at respective opposite ends to the stationary and movable members so as to collapse and expand the curtain length along a generally linear path in accordance with relative movement between the members, said curtain support comprising: first and second pulley support means for supporting a flexible cable, said first and second pulley support means being spaced along the curtain path and affixed to one of said stationary member and movable member, and wherein said first and second pulley support means include respective first and second pulleys; a flexible cable trained over said first and second pulleys and running along the curtain path; means for suspending the extensible curtain from the cable, and means for attaching the flexible cable to the other of said stationary member and movable member, so as to vary the length of cable running along the curtain path as the extensible curtain collapses and expands.

2. The support of claim 1, further comprising: means for tensioning the flexible cable.

3. The support of claim 2, further comprising: means for relieving tension from the flexible cable.

4. The support of claim 2, wherein said attaching means includes means for relieving tension from the flexible cable.

5. The support of claim 4, wherein said tension relieving means further includes a separable release member.

6. In a device having a relatively stationary member, a relatively movable member and an extensible curtain connected at respective opposite ends to the members, the curtain being supported across its span by a tensioned cable which runs between the stationary member and the movable member, a cable overload protector, comprising:
 a cable of predetermined length, L;
 means for guiding said cable;
 means for connecting an end of said cable to one of said stationary member and movable member;
 means for tensioning said cable to a first tension force, $T_1$;
 means for releasing said cable end when a predetermined maximum cable tension force $T_2$ has been exceeded;
 means for connecting a tether of predetermined length, $L_2$, to said cable end and to said one member and maintaining said cable within said cable guide means at a second tension force, $T_3$, when said cable end is released.

7. The cable overload protector of claim 6, wherein said cable guiding means comprises a pulley affixed to the other of said stationary member and movable member.

8. In a device having a relatively stationary member, a relatively movable member and an extensible curtain connected at respective opposite ends to the members, the curtain being supported across its span by a tensioned cable which runs between the stationary member and movable member, a method for protecting the cable against overload, comprising the following steps;
 providing a cable of predetermined length, $L_1$;
 guiding the cable;
 connecting an end of the cable to one of said stationary member and movable member;
 tensioning the cable to a first tension force, $T_1$;
 supporting the curtain with a portion of the cable;
 releasing the cable end when a predetermined maximum cable tension force, $T_2$, is exceeded;
 connecting a tether of predetermined length, $L_2$, to the cable end and to said one member;
 maintaining the cable within the cable guide means at a second tension force, $T_3$, after the cable end is released; and continuing to support the curtain with the cable portion after the cable end is released.

9. The method of claim 8, wherein the step of guiding the cable comprises:
 training the cable over a grooved pulley, in contact with the pulley groove, such that the tensioned cable portions immediately adjacent the pulley groove establish a cable plane; and
 wherein the step of maintaining the cable comprises: keeping the cable within the pulley groove and the cable end within said cable plane.

10. A curtain system for use in a machine having a relatively stationary base and a relatively movable slide, which is reversibly movable along a generally horizontal path between spaced first and second end points defined on the base, the curtain system comprising: first pulley means for supporting and guiding a cable, said first pulley means being mounted proximal said first end point; second pulley means for supporting and guiding a cable, said second pulley means being mounted proximal said second end point; cable means for supporting a curtain, said cable means comprising a flexible cable having the following serially disposed sections:
 (a) a first support portion running generally horizontally from said slide to said first pulley means;
 (b) a first direction turnaround portion;
 (c) a connector portion running from said first pulley means to said second pulley means;
 (d) a second direction turnaround portion;
 (e) a second support portion running generally horizontally from said second pulley means to said slide;
means for connecting said cable to said slide; a first extensible curtain, having opposite ends connected respectively to the slide and the first pulley means; a second extensible curtain, having opposite ends connected respectively to said slide and said second pulley means; means for tensioning said flexible cable to a predetermined tension force; means for supporting the first extensible curtain by the first support portion of the flexible cable; and means for supporting the second extensible curtain by the second support portion of the flexible cable, wherein movement of the slide toward the first end point and away from the second end point simultaneously shortens the first portion of the flexible cable, collapses the first curtain, lengthens the second portion of the flexible cable, and expands the second curtain.

11. The curtain system of claim 10, wherein the serially disposed sections of the flexible curtain lie in a common plane.

12. The curtain system of claim 11, wherein the common plane is substantially vertical.

13. The curtain system of claim 10, wherein the cable connecting means comprises: means for connecting an end of the cable to the slide; means for releasing said cable end when a predetermined maximum cable tension force has been exceeded; means for connecting a tether of predetermined length to said cable end and to the slide and maintaining the flexible cable at a second tension force when said cable end is released.

14. The curtain system of claim 13, wherein the serially disposed sections of the flexible cable lie in a common plane before and after the cable end is released.

15. The curtain system of claim 14, wherein said common plane substantially vertical.

* * * * *